United States Patent [19]

Henderson

[11] Patent Number: 4,848,109
[45] Date of Patent: Jul. 18, 1989

[54] THEFT PREVENTION APPARATUS

[76] Inventor: Robert W. Henderson, Rte. 2, Box 719, Quinlan, Tex. 75474

[21] Appl. No.: 175,237

[22] Filed: Mar. 30, 1988

[51] Int. Cl.⁴ .............................................. E05B 65/12
[52] U.S. Cl. ........................................ 70/14; 70/225; 70/259; 248/552
[58] Field of Search .................... 70/14, 259, 260, 234, 70/164, 225, 226, 18; 224/42.21, 42.23, 42.24, 42.25; 248/551–553

[56] References Cited

U.S. PATENT DOCUMENTS

| | | | |
|---|---|---|---|
| 925,810 | 6/1909 | Hopping | 70/226 |
| 1,203,398 | 10/1916 | Perkins | 70/259 |
| 1,259,974 | 3/1918 | Gingrich | 70/260 |
| 1,416,393 | 5/1922 | Willett | 70/227 |
| 1,438,656 | 12/1922 | Mahoney | 70/227 |
| 1,570,477 | 1/1926 | Godshalk | 70/260 |
| 1,638,264 | 8/1927 | Junkunc | 70/260 |
| 4,013,203 | 3/1977 | McCauley | 70/259 X |
| 4,329,107 | 5/1982 | Smith | 224/42.23 X |
| 4,680,949 | 7/1987 | Stewart | 70/14 |
| 4,683,728 | 8/1987 | Hailey | 70/14 |

FOREIGN PATENT DOCUMENTS 693503 7/1953 United Kingdom ................ 70/227

Primary Examiner—Lloyd A. Gall
Attorney, Agent, or Firm—Kanz, Scherback & Timmons

[57] ABSTRACT

A motor vehicle is disclosed including an apparatus for preventing theft of a spare tire, including a tire rim forming an aperture, a spare tire mounted on the rim, a bracket, sling or cable lift for securing the spare tire and rim, a metal shaft securely affixed to the motor vehicle, a metal strap looping metal shaft, a shackle engaging the rim and both ends of the strap by passing through an aperture formed near each end of the strap and the aperture formed by the rim, and a locking device for locking onto both ends of the shackle.

5 Claims, 1 Drawing Sheet

THEFT PREVENTION APPARATUS

DESCRIPTION

1. Technical Field

The present invention relates generally to theft prevention apparatus and in one of its aspects to motor vehicles and apparatus for preventing theft of spare tires from pickup trucks and vans.

In many pickup trucks, a spare tire is mounted underneath the bed either by a cable lift mechanism or a sling arrangement. On many vans, a spare tire is mounted externally on the back. It is common to have a mounting brace affixed to the back of the van, the mounting brace holding the bracket for securing the spare tire.

2. Background Art

Externally mounted spare tires such as those found on pickup trucks and vans are frequent targets of theft since they are visible and easily accessible. It is not uncommon for operators of such pickup trucks and vans to try to secure a spare tire by a chain and padlock. The chain must be wrapped around the tire and then secured to some other object which is affixed to the truck before the padlock can then be secured to the two ends of the chain. Wrapping the chain around the tire is awkward, and the chain can be cut fairly easily with bolt cutters.

DISCLOSURE OF INVENTION

In accordance with the present invention, an improved motor vehicle includes not only a tire rim forming at least one aperture for receiving a stud, a spare tire mounted on the tire rim, means for securing the spare tire and rim to the motor vehicle, and some form of metal shaft such as the rotation shaft for a cable lift system or part of a mounting brace for holding the securing means to the motor vehicle, but also includes a metal strap, preferably made of hardened steels such as hot rolled steel, looping the metal shaft and forming an aperture near each end, a shackle engaging both ends of the strap and the rim by passing through both apertures formed by the strap and the at least one aperature formed by the rim, and a locking device. The locking device lockably engages both ends of the shackle.

These and other objects, advantages and features of this invention will be apparent from the following description taken with reference to the accompanying drawing, wherein is shown the preferred embodiments of the invention.

BEST MODE FOR CARRYING OUT THE INVENTION

Figure 1:
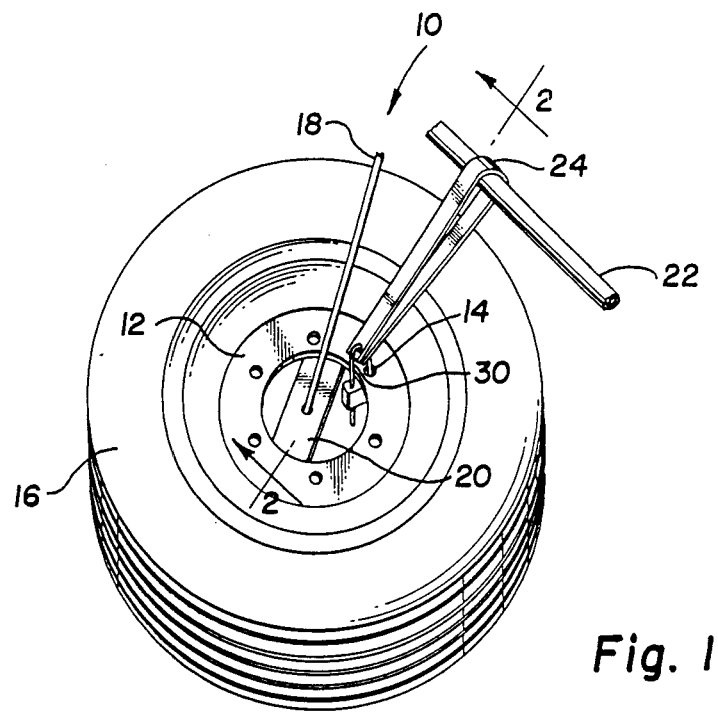
FIG. 1 is a partial view of a motor vehicle and theft prevention apparatus according to the present invention.
Figure 2:
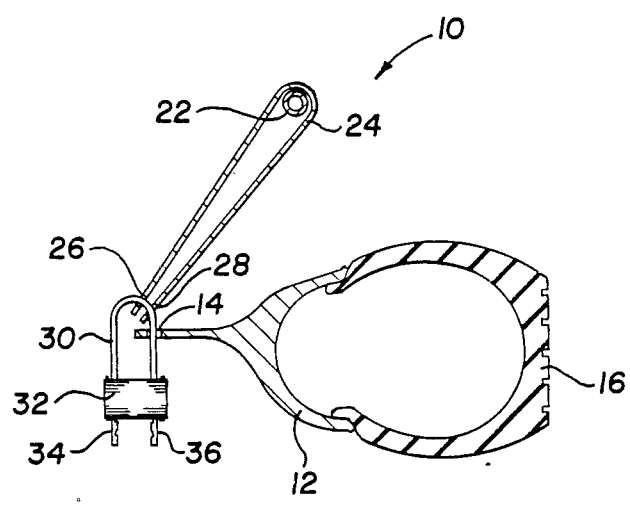
FIG. 2 is a sectional view thereof taken at 2—2 of FIG. 1.

Referring now to the drawing, a partial view of a motor vehicle according to the present invention is referred to generally by reference numeral 10. Motor vehicle 10 is a vehicle such as a pickup truck or van, which is well known in the art. Motor vehicle 10 includes a tire rim 12 forming at least one aperture 14 for receiving a stud when mounted for operation on the motor vehicle. A spare tire 16 is mounted on tire rim 12. Means for securing spare tire 16 and rim 12 to the motor vehicle includes cable 18 which engages lift member 20 which in turn engages rim 12. Rotation shaft 22 is used for raising and lowering spare tire 16 and rim 12 by winding and unwinding cable 18. A metal strap 24 loops metal rotation shaft 22 and forms an aperture near each end, apertures 26 and 28. In a preferred form, metal strap 24 is of a hardened metal such hot rolled steel. A shackle 30 engages the rim and both ends of the strap by passing through both apertures 26 and 28 formed by the strap and the at least one aperature 14 formed by the rim. A locking device 32 lockably engages both ends 34 and 36 of the shackle.

It can thus easily be seen that the apparatus for preventing theft of tire 16 mounted on rim 12, including metal strap 24 for looping a secure object such as metal rotation shaft 22, shackle 30 engaging both ends of the strap for also engaging the rim, and locking device 32 for lockably engaging both ends of the shackle when the shackle is engaging the rim is one well adapted for prevention of tire theft. It is far easier to secure the apparatus of the present invention than wrapping a chain around the tire and some other secure object. Furthermore, it is not easily cut with bolt cutters since it would be difficult to get bolt cutters into a working position between the tire and truck bed or between the tire and van. Furthermore, the lock itself in the present invention, comprising shackle 30 and locking device 32, secures the rim by passing through an aperture in rim itself.

It is also easy to see that the theft prevention apparatus is one which could be easily adapted for many other uses without departing from the scope thereof. In a preferred embodiment, the locking device and shackle can form a conventional padlock with either a pivoted or sliding shackle.

From the foregoing it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth is shown in the figures of the accompanying drawing is to be interpreted as illustrative and not in a limiting sense.

I claim:

1. An apparatus for preventing theft of a tire mounted on a rim forming at least one aperture, comprising in combination;
    a metal strap for looping a secure object, and forming an aperture near each end;
    a shackle engaging both ends of the strap by passing through both apertures formed by the strap, for engaging the rim by passing through the at least one aperture formed by the rim; and
    a locking device for lockably engaging both ends of the shackle when the shackle is engaging the rim.

2. An apparatus according to claim 1 wherein the metal strap comprises hot rolled steel.

3. In a motor vehicle, the improvement comprising in combination:

a tire rim forming at least one aperture for receiving a stud;

a spare tire mounted on the tire rim;

means for securing the spare tire and rim to the motor vehicle;

a metal shaft securely affixed to the motor vehicle in the vicinity of the spare tire and rim;

a strap looping the metal shaft, forming an aperture near each end;

a shackle engaging the rim and both ends of the strap by passing through both apertures formed by the strap and the at least one aperture formed by the rim; and a locking device lockably engaging both ends of the shackle.

4. The motor vehicle of claim 3 wherein the strap comprises hot rolled steel.

5. The motor vehicle of claim 4 wherein the motor vehicle is a pickup truck; the means for securing the spare tire and rim comprises a cable lift and the metal shaft is a rotation shaft used for raising and lowering the spare tire and rim by winding and unwinding the cable.

* * * * *